United States Patent [19]
Brassette

[11] 3,932,984
[45] Jan. 20, 1976

[54] HARVESTING TOPPER WITH CURVED DEFLECTORS

[75] Inventor: Donald J. Brassette, Raceland, La.

[73] Assignee: Thomson International Company, Thibodaux, La.

[22] Filed: July 25, 1974

[21] Appl. No.: 491,781

[52] U.S. Cl. .................................................. 56/63
[51] Int. Cl.² ........................................ A01D 45/02
[58] Field of Search ........................... 56/63, 56–59, 56/192, 295, 6

[56] References Cited
UNITED STATES PATENTS

| | | |
|---|---|---|
| 3,391,522 | 7/1968 | Zweegers .................................... 56/6 |
| 3,443,369 | 5/1969 | Zweegers .................................... 56/6 |
| 3,596,447 | 8/1971 | Makeham et al. ......................... 56/63 |
| 3,772,864 | 11/1973 | Rodrigue ................................. 56/63 |

*Primary Examiner*—Russell R. Kinsey
*Attorney, Agent, or Firm*—Browning & Bushman

[57] ABSTRACT

A harvesting topper comprising an upstanding deflecting structure having a curved outwardly convex deflector extending outwardly therefrom. The deflecting structure has an axis, and the topper includes means for mounting said topper for rotation about said axis.

6 Claims, 4 Drawing Figures

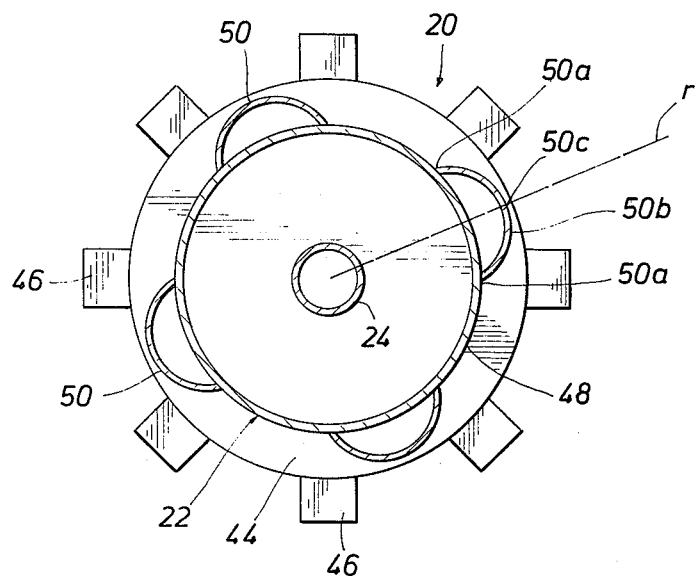
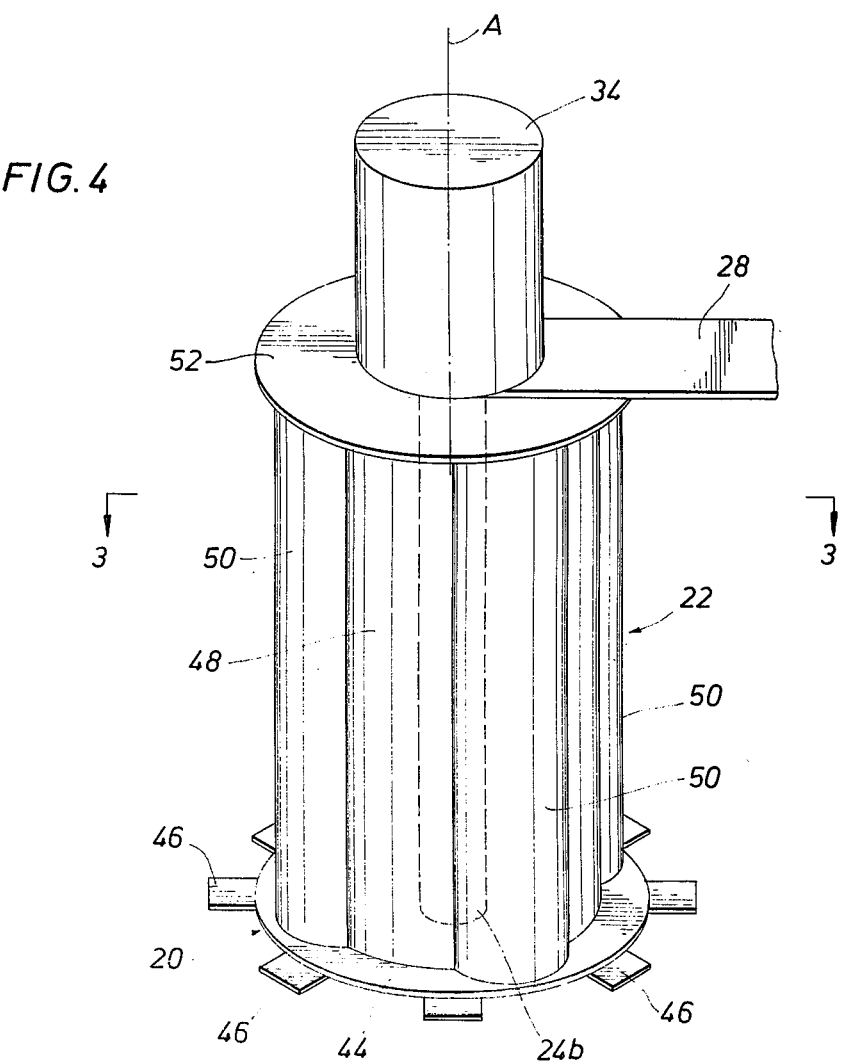

HARVESTING TOPPER WITH CURVED DEFLECTORS

BACKGROUND OF THE INVENTION

1. Field of the Invention

The present invention pertains to harvesting machinery, particularly to toppers for use on harvesting machines, and especially for machines for harvesting crops such as sugar cane. Sugar cane grows in the form of tall stalks with long ribbon-like leaves. The leaves are located on the upper parts of these stalks, known as the tops, which are relatively soft. The tops are not used in production of sugar cane juice and its products and must be removed before the remainders of the stalks are gathered for processing.

The machines used for harvesting sugar cane are usually vehicles which can move through the cane field cutting the cane as they go. They include means for drawing the stalks into a narrow portion of the machine where they are cut. A lower knife cuts the entire cane stalk off near the ground, and a topper cuts off the top. The topper includes some type of deflecting structure for flipping the cut tops to one side of the machine or the other. It is most desirable to have a deflecting structure which is reversible so that the cane tops can be deflected to either side desired.

2. Description of the Prior Art

One type of deflector used in prior art toppers was in the form of a paddle rotatably mounted above the knife of the topper. The paddle was disposed at an angle to a true radius of its axis so as to better project the cane to the desired side of the machine. To reverse the direction of deflection, it was necessary to remove the paddle from the machine and turn it over so as to reverse the angle. This arrangement was inconvenient and time consuming.

Another type of topper employed a deflecting structure in the form of a regular polygonal box which could be rotated in either direction by reversible drive means. The flat walls of the box formed deflecting surfaces which would deflect the cane in the direction of rotation. Although easier to reverse than the other type of deflector, the box was difficult and, indeed, impossible to fabricate perfectly symmetrically. Even when constructed as symmetrically as possible, it often caused vibration problems as it was rotated about its axis.

Another known type of topper included a cylindrical core having a plurality of radially extending blades. This type has the disadvantage that the ribbon-like leaves of the cane tend to become caught on the blades and carried around and into the machinery, a phenomenon known as "backfeeding." In some cases, the box-type topper described above might, to a lesser extent, also produce backfeeding. The bladed topper as well as the box-type topper are disclosed in prior U.S. Pat. No. 3,772,864.

SUMMARY OF THE INVENTION

The harvesting topper of the present invention includes an upstanding deflecting structure having an axis and means connected to the deflecting structure for mounting the topper for rotation about that axis. The deflecting structure has a curved outwardly convex deflector.

The deflecting structure preferably comprises a cylindrical carrier with one or more deflectors attached to its side surface. The deflectors are circumferentially symmetrically disposed about the carrier.

The curved deflectors eliminate the backfeeding problem present in other types of toppers having deflectors with relatively sharp edges or corners and/or narrow cross sections. This is particularly true if each of the curved deflectors has side edges which are substantially circumferentially spaced from each other on the deflecting structure so that the deflector has a broad base.

Additionally, in the preferred embodiments, including the cylindrical carrier, or at least a carrier of circular cross-section transverse to its axis, the deflecting structure is much easier to construct and to make vibration free than the box-type topper. The cylindrical carrier makes up the bulk of the deflecting structure and it can be made virtually perfectly symmetrical. The deflectors too can be formed to define circular arcs so that they too can be easily made symmetrical. It is thus possible to achieve substantially perfect balance of the deflecting structure.

At the same time, the deflecting structure of the present invention is easily reversed by simply reversing the drive means which rotate the topper on the harvestor. There is no need to remove or modify any part of the deflecting structure in order to reverse the direction of deflection of the cane. Thus, the topper of the invention provides all the advantages of the prior box and blade type toppers while eliminating their disadvantages.

It is thus an object of the invention to provide a harvesting topper with a deflecting structure having a curved outwardly convex deflector.

Another object of the invention is to provide an easily reversed harvesting topper which is free of backfeeding problems.

Still another object of the invention is to provide an easily reversed harvesting topper which is free of vibration problems.

Other objects and advantages of the invention will be made apparent by the detailed description of a preferred embodiment, the drawings and the claims.

BRIEF DESCRIPTION OF THE DRAWINGS

FIG. 3 is a transverse cross section on an enlarged scale of the topper of FIGS. 1 and 2 taken along lines 3—3 of FIG. 4.

FIG. 4 is a perspective view on an enlarged scale of the topper and drive means.

DESCRIPTION OF THE PREFERRED EMBODIMENT

Figure 1:
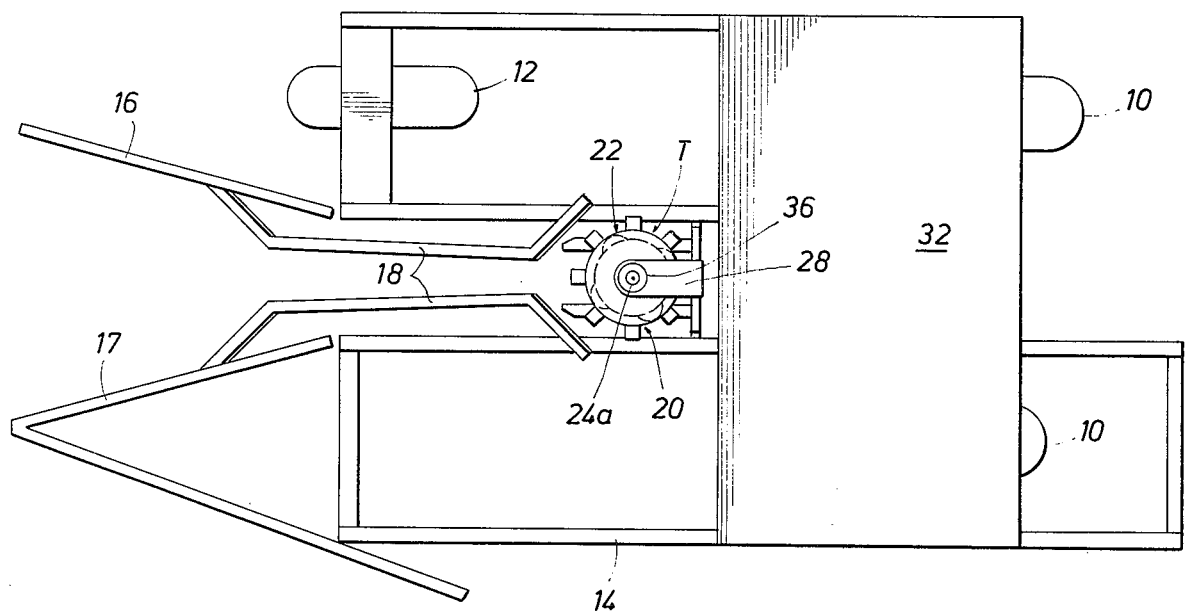
FIG. 1 is a diagrammatic plan view along lines 1—1 of FIG. 2 of a harvesting machine comprising a topper in accord with the invention.
Figure 2:
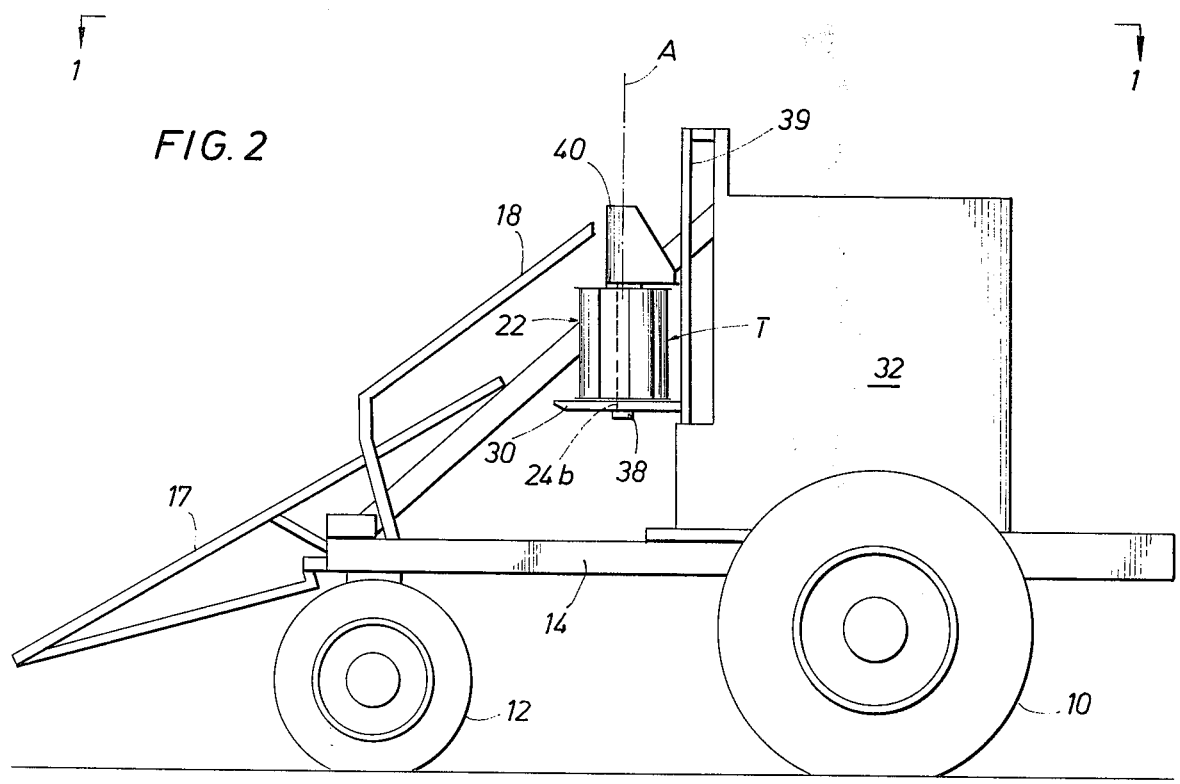
FIG. 2 is a diagrammatic side elevation of the harvesting machine of FIG. 1.

Referring to FIGS. 1 and 2, there is shown in somewhat diagrammatic form a harvesting machine having a topper in accord with the present invention mounted thereon. The machine is a vehicle having large rear wheels 10 and a smaller front wheel 12. The machine also includes a frame 14. The cane gathering structures, indicated diagrammatically at 16, 17 and 18 are mounted on the frame 14. In operation the machine moves along a row of cane so that the stalks are disposed between the outermost gathering structures 16 and 17. Structures 16 and 17 are sloped upwardly and also inwardly toward each other from their outer to their inner ends. Structures 18 extend generally from the inner ends of structures 16 and 17 to the topper T and slope further upwardly and inwardly. Thus, as the machine moves along the row, the stalks of cane in that row are drawn together and directed into the narrow portion of the machine between the inner ends of structures 18 at the center of the machine at which is located the topper T. Structures 16, 17 and 18 may comprise endless conveyors or the like with cane-engaging elements for helping to draw the cane to the narrow portion of the machine.

The topper T which rotates about the axis A comprises a knife 20 for cutting off the tops of the cane which has been drawn into the topper and a deflecting structure 22 for deflecting the cut tops to the side of the machine.

Respective upper and lower ends 24a and 24b of a shaft 24 project from the ends of the topper and serve as means for mounting the topper for rotation about the axis A. The topper is mounted for rotation between an upper bracket 28 and a lower support 30 extending horizontally outwardly from the body 32 of the machine, the body 32 being mounted on the frame 14. Shaft end 24a is rotatably mounted in the bracket 28 and secured by a nut 36. Shaft end 24a extends upwardly beyond the nut 36 where it is connected to the drive means, motor 34 (FIG. 4). Shaft end 24b is rotatably mounted in the lower support 30 and secured by a nut 38.

Reversible drive means are connected to the topper for selectively rotating it about axis A in either the clockwise or counterclockwise direction. As shown, the drive means is a hydraulic motor 34 mounted above the topper (see FIG. 4). The motor 34 has been broken away in FIG. 1 in order to show the bracket 28, shaft end 24a and nut 36. Shields, one of which is shown at 40, may be provided to protect the motor 34. The topper T, bracket 28 and lower support 30 are also mounted for vertical adjustment on rails 39.

The remainder of the machine, e.g. engine, operator's controls, etc., is represented diagramatically by the body 32.

Turning now to FIGS. 3 and 4 for a more detailed description of the topper, it will be noted that the axis A is substantially vertical. While it may not always be necessary to provide a truly vertical axis, the axis should always be upstanding in the sense that it has a substantial vertical component of direction. The deflecting structure 22 is also upstanding in this sense. The deflecting structure 22 comprises an upstanding carrier 48 having the axis A as its longitudinal axis. The carrier is circular in cross-section transverse to the axis A and is preferably cylindrical as shown.

The deflecting structure also comprises a plurality of curved, outwardly convex deflectors 50 attached to the side surface, i.e. the cylindrical outer surface, which faces laterally outwardly with respect to the carrier axis of the carrier 48 and projecting radially outwardly therefrom. Each deflector 50 has a curved outwardly convex surface 50b which faces generally laterally outwardly with respect to the laterally outwardly facing surface of the carrier 48. In some cases it might be possible to construct the topper with only one deflector 50. However the preferred embodiments include a plurality of deflectors 50 symmetrically circumferentially spaced about the carrier 48 for better balance.

The convex curvature of the deflectors 50 eliminates the backfeeding problems present in the bladed toppers of the prior art and, to a lesser extent, in the prior box-type toppers. The smooth curved outer surface 50b of each deflector 50 has no sharp edges or corners to catch the cane leaves. This feature is even further enhanced in the preferred embodiment shown since each of the deflectors 50 has two side edges 50a by which the deflector 50 is attached to the carrier 48 and which are substantially circumferentially spaced from each other on the carrier 48. This gives each deflector 50 a broad base at its attachment to the carrier. In fact, the entire cross-sectional shape of the deflectors 50 is broad as compared with the thin cross-section of a blade. As seen in FIG. 3, the base of each deflector 50, measured between its side edges 50a, is at least as long as, and in the preferred embodiment even longer than, the radial dimension of the deflector measured from the carrier 48 to the radial outermost point 50c of the deflector 50. The broad base and generally broad cross-sectional configuration serves to further eliminate the backfeeding problem.

The portions of the outer surface 50b of each deflector 50 on opposite sides of the outermost point 50c may be considered leading sides for respective directions of rotation. It will be appreciated that whichever direction the topper is rotated, each deflector will have a leading side which, from its side edge 50a to the point 50c is sloped tangentially backward with respect to the direction of rotation. This further reduces the tendency of the leaves to become caught on the deflectors 50 as they do on blade-type deflectors having radially directed sides without such tangential component.

The topper of the present invention also eliminates the vibration problems present in the prior box-type toppers by virtue of the fact that the carrier is circular in cross-section and can thus be made perfectly symmetrical. It is particularly easy to construct the carrier symmetrically if it is cylindrical as shown. This balance is further enhanced if the deflectors 50 are symmetrically circumferentially disposed about the carrier 48 and if each deflector, as viewed in cross section transverse to the carrier axis, is symmetrical about a radius, e.g. r, of the carrier. In the preferred form, the deflectors each have an outer surface 50b which forms a circular arc. Thus, the deflectors, as well as the carrier, can easily be made perfectly symmetrical so that the topper is balanced and vibration free.

In the topper shown, the deflectors 50 are four in number. However, it will be understood that this number can be varied. Additionally, the shape of the deflectors could be varied, e.g. the type of arc used or the number of degrees in the arc could be changed. Furthermore, while the preferred embodiment comprises a carrier with separate deflectors attached to its side surface for ease of construction and balance, it would be possible to construct the topper with a unitary deflecting structure having the carrier and deflectors in one piece.

The deflecting structure is closed at its upper end by a disc 52. The lower end of the deflecting structure is closed by the knife 20 which comprises a disc 44 with a plurality of radially extending blades 46 about its periphery. The knife 20 is rotated with the deflecting structure 22 by the motor 34.

From the above description it will be apparent that the present invention provides a harvesting topper which is easily reversed by conventional reversible drive means without the need for removal or adjustment of any part of the deflecting structure. At the same time, the topper of the present invention is free of the backfeeding and vibration problems of the prior easily reversed toppers. The topper of the invention is also easy to manufacture and to operate.

It will be appreciated that many modifications may be made in the harvesting topper of the invention without departing from the invention. It is, therefore, intended that the scope of the invention be limited only by the appended claims.

I claim:

1. Deflector apparatus for a harvesting topper, said deflector apparatus comprising:

an upstanding carrier having an upstanding axis and a surface facing laterally outwardly with respect to said axis;

a deflector on said carrier, and projecting laterally outwardly therefrom, said deflector having two side edges circumferentially spaced from each other on the laterally outwardly facing surface of said carrier and a curved outwardly convex deflector surface extending between said two side edges, said deflector surface facing generally laterally outwardly with respect to said laterally outwardly facing surface of said carrier; and means connected to said carrier for mounting said deflecting apparatus for rotation about the axis of said carrier.

2. Deflector apparatus according to claim 1 wherein said laterally outwardly facing surface of said carrier is circular in cross-section transverse to said axis, said deflector being rigidly attached to said laterally outwardly facing surface.

3. Deflector apparatus according to claim 2 wherein said carrier is cylindrical.

4. Deflector apparatus according to claim 2 wherein said deflector, in cross section transverse to said axis, is symmetrical about a radius of said carrier.

5. Deflector apparatus according to claim 4 further comprising a plurality of said deflectors symmetrically circumferentially spaced about said carrier.

6. Deflector apparatus according to claim 5 wherein said deflector surface defines a circular arc.

* * * * *